Patented Sept. 24, 1935

2,015,234

UNITED STATES PATENT OFFICE 2,015,234

CHEMICAL PRODUCT AND PROCESS FOR PRODUCING SAME

Ernest Rodman, Marshallton, Del., assignor to E. I. du Pont de Nemours & Company, Wilmington, Del., a corporation of Delaware No Drawing. Application December 23, 1933, Serial No. 703,847

7 Claims. (Cl. 106—23)

This invention relates to rubber compositions and processes for preparing the same. More particularly, it relates to the use of higher polyhydric alcohols in dispersing pigments in rubber. Still more particularly it relates to the use of higher polyhydric alcohols, both saturated and unsaturated in dispersing carbon black in rubber.

One object of this invention is the production of rubber compositions and rubber articles by the use of higher polyhydric alcohols as agents for dispersing pigments in the rubber mix. A more specific object of the invention is the production of rubber compositions and rubber articles by the use of higher polyhydric alcohols as agents for dispersing carbon black in the rubber mix. Other objects will appear hereinafter.

Carbon black is one of the best known ingredients used in rubber compositions. It serves to impart to the rubber an abrasion resistance and also serves as a pigment and reenforcing agent for the rubber. One of the problems, however, in dealing with carbon black in this connection is that of properly dispersing the carbon black in the rubber. By the use of the higher polyhydric alcohols, described below, in accordance with the present invention, the carbon black is dispersed in rubber far more thoroughly, rapidly, and efficiently than where prior art dispersing agents are used, and in addition the finished rubber articles produced thereby show a remarkable increase in abrasion resistance and in other beneficial properties when compared with articles produced by a process not involving an alcohol of this character. In addition the higher polyhydric alcohols act as softeners and enhance the processing of stocks containing them.

The following examples which are to be considered as illustrative only embody preferred methods for utilizing the invention.

*Masterbatch A*

A masterbatch was prepared according to conventional methods, having the following composition:

|  | Parts by weight |
|---|---|
| Smoked sheets | 100 |
| Carbon black | 67.7 |
| Octadecanediol-1,12 | 1.4 |

The carbon black used in the above composition was a channel black and is a product that is commonly used in the compounding of pneumatic tire treads.

The octadecanediol-1,12 was prepared by the catalytic hydrogenation of castor oil at a temperature above 250° C. and under high superatmospheric pressure.

A masterbatch containing the additional ingredients to vulcanize the above masterbatch was prepared and had the following composition:

*Masterbatch B*

|  | Parts by weight |
|---|---|
| Smoked sheets | 40 |
| Di-ortho-tolyl-guanidine | 1 |
| Zinc oxide | 5 |
| Sulfur | 3.25 |

The two masterbatches were blended on a rubber mill, with the mill rolls heated to 70° C. by means of a hot water circulation system. The masterbatches were blended in the following proportions:

|  | Parts by weight |
|---|---|
| Masterbatch A | 101.4 |
| Masterbatch B | 49.25 |

The blended mix may be rewritten with the ingredients in the following proportions:

|  | Parts by weight |
|---|---|
| Smoked sheets | 100 |
| Zinc oxide | 5 |
| Carbon black | 40.25 |
| Di-ortho-tolyl-guanidine | 1 |
| Sulfur | 3.25 |
| Octadecanediol-1,12 | 0.8 |

It will be noted that approximately 2% of the dispersing agent, alcohol, was used, based on the weight of the carbon black.

Slabs 6" x 6" x 0.085" were vulcanized for 40 minutes at 40 pounds steam pressure (141.5° C.) and were tested on a Scott testing machine for tensile, stress-strain and for elongation at break. Abrasion buttons for the abrasion test were vulcanized 45 minutes at 40 pounds steam pressure and were prepared and tested on the Williams abrasion machine according to the procedure outlined in Industrial and Engineering Chemistry, June 1927, page 674. The same proportions of ingredients and the same general procedure as is given in the above example were followed, using, instead of octadecanediol, other polyhydric alcohols. The results obtained for the various dispersing agents may be summarized as follows:

| Dispersing agent used | Milling time (min.) | Relative abrasion resistance | Stress at 500% elongation | Tensile at break | Percent elongation at break |
|---|---|---|---|---|---|
| None (primary control) | 7 | 100 | 3075 | 4400 | 630 |
| Stearic acid (secondary control) | 6 | 101 | 2900 | 4450 | 650 |
| Hydrogenated methyl laurate dimer (1) | 7 | 132 | 3075 | 4675 | 650 |
| Octadecanediol-1,12 (2) | 6 | 124 | 2975 | 4450 | 640 |
| Octadecanetriol-1,9,10 (3) | 5.5 | 105 | 2925 | 4550 | 660 |
| Hydrogenated methyl stearate dimer (4) | 6 | 113 | 2650 | 4925 | 700 |
| Hydrogenated methyl stearate dimer (5) | 5.5 | 170 | 2500 | 4425 | 680 |

(1) Hydrogenated methyl laurate dimer has the formula:

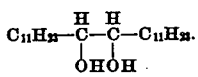

(2) Octadecanediol-1,12 has the formula:

$CH_3(CH_2)_5.CH(OH).(CH_2)_{10}CH_2OH$.

(3) Octadecanetriol-1,9,10 has the formula:

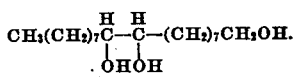

(4) Hydrogenated methyl stearate dimer has the formula:

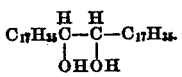

(5) In this experiment 8% of hydrogenated methyl stearate dimer, based on the carbon black, was used as compared with approximately 2% in each of the other cases.

The stearic acid listed in the above table is a dispersing agent well known and commonly used in the prior art. The above table illustrates the remarkable increase in abrasion resistance, maintenance of tensile strength and of elongation at break when using the high polyhydric alcohols as compared with the prior use of stearic acid and as compared with no dispersing agent.

The alcohols which are preferred in carrying out the present invention are the dihydric alcohols of the type of octadecanediol and hydrogenated methyl laurate dimer, but the invention is not to be limited to alcohols of this type. In its broad scope it will include the higher polyhydric alcohols, both saturated and unsaturated, and having eight or more carbon atoms, among these may be mentioned 9-octadecene-1,12-diol, having the formula $CH_3(CH_2)_5CH(OH)CH_2CH:CH(CH_2)_7CH_2OH$ (obtained from ricinoleic acid by selective hydrogenation); lauryl trimethylol methane, having the formula $C_{11}H_{23}.C(CH_2OH)_3$ (obtained by reacting lauric aldehyde with formaldehyde); palmityl trimethylol methane; stearyl trimethylol methane; hydrogenated methyl oleate dimer; and hydrogenated methyl palmitate dimer, and glycols of the type of octamethylene glycol and decamethylene glycol.

Hydrogenated dimers of the type of hydrogenated methyl stearate dimer are compounds which are the subject matter of co-pending patent applications. They may be prepared, for example, by reacting a methyl, ethyl or propyl ester of a higher fatty acid containing 12 to 18 carbon atoms with molten sodium in the presence of xylene. When the reaction is complete an alcohol is added to neutralize the alkali and this is followed by the addition of a slight excess of dilute sulfuric acid and then after the xylene solution has been washed free of acid and salt with water the resulting keto-alcohol is separated from the xylene solution by fractional crystallization. This keto-alcohol may then be hydrogenated in alcoholic solution in the presence of a nickel-on-kieselguhr catalyst at a temperature of 150–175° C. and a pressure of 1,000–2,000 pounds per square inch to give the hydrogenated dimer described above.

The amount of alcohol used will preferably be from 1 to 5% based on the carbon black or pigment, but amounts as low as .5% to as high as 10% on the same basis may be used. The proportion of carbon black or of other pigment, as well as of all the other ingredients may, of course, be varied from the formula given above, but will ordinarily not exceed 80% by weight of the amount of rubber present in the mix.

While only carbon black has been used in the above examples, it is to be understood that the invention is not to be limited to this pigment. Other pigments, fillers or reenforcing agents, such as lithopone, titanox, titanium oxide, zinc oxide, whiting, china clay, etc., may be used. However, the invention is particularly applicable to carbon black.

The alcohol may be incorporated in the mix in several different ways. It may, for example, be added by "sweating" it onto the pigment from a suitable solution and then removing the solvent from the pigment by evaporation, or it may be directly incorporated with the rubber on the rolls, previous to the addition of the pigment, along with the pigment or following the pigment, or the pigment may be treated with the alcohol in the vapor phase, whereby the vapors of the alcohol are adsorbed onto the pigment. This latter method of incorporating the alcohol is applicable to other pigments than carbon black, e. g., lithopone, titanox, zinc oxide, etc., and pigments thus treated are more readily dispersed not only in rubber, but also in oil-type compositions.

The above description and specific examples are to be taken as illustrative only. Any departure therefrom which conforms to the spirit of the invention is intended to be included within the scope of the claims.

I claim:

1. A rubber composition containing a pigment and a dispersing agent selected from the group consisting of aliphatic dihydric and aliphatic trihydric alcohols containing at least 8 carbon atoms.

2. A rubber composition containing carbon black and a dispersing agent selected from the group consisting of aliphatic dihydric and aliphatic trihydric alcohols containing at least 8 carbon atoms.

3. A rubber composition containing carbon black and a dispersing agent selected from the group consisting of straight chain aliphatic dihydric alcohols and straight chain aliphatic trihydric alcohols containing at least 8 carbon atoms.

4. A rubber composition containing carbon black and a dispersing agent which is a straight chain aliphatic dihydric alcohol containing at least 8 carbon atoms.

5. The product of claim 4 wherein the amount of dihydric alcohol is within the range of 1 to 5 per cent of the amount of carbon black.

6. A rubber composition containing carbon black and a dispersing agent which is octadecanediol.

7. A rubber composition containing carbon black and a dispersing agent which is hydrogenated methyl laurate dimer.

ERNEST RODMAN.